United States Patent [19]

Bertini

[11] Patent Number: 5,572,915
[45] Date of Patent: Nov. 12, 1996

[54] PULL BAR GRIPPER ASSEMBLY

[76] Inventor: Millo Bertini, 679 Garden St., Trumbull, Conn. 06611

[21] Appl. No.: 323,753

[22] Filed: Oct. 17, 1994

[51] Int. Cl.⁶ ..........................................................
[52] U.S. Cl. ....................... 82/127; B23B/15/00
[58] Field of Search ................. 82/127, 124, 162; 279/109; 294/110.1, 115; 901/31, 36; 414/14, 17, 18

[56] References Cited

U.S. PATENT DOCUMENTS

| | | | |
|---|---|---|---|
| 1,467,992 | 9/1923 | Becker | 279/109 |
| 1,523,063 | 1/1925 | Fuchs | 294/115 |
| 2,377,383 | 6/1945 | Slovak . | |
| 3,582,000 | 6/1971 | Werkmeister et al. | 414/14 |
| 3,939,847 | 2/1976 | Peyton | 294/115 |
| 3,981,673 | 9/1976 | Sokolow | 294/115 |
| 4,580,470 | 4/1986 | Buck | 82/127 |
| 4,617,847 | 10/1986 | Schaldach | 82/127 |
| 4,709,603 | 12/1987 | Buck | 82/127 |
| 4,924,738 | 5/1990 | Che . | |
| 5,046,226 | 9/1991 | Che . | |
| 5,165,313 | 11/1992 | Karr | 82/127 |

Primary Examiner—M. Rachuba
Assistant Examiner—Kenneth S. Hansen
Attorney, Agent, or Firm—Fattibene and Fattibene; Arthur T. Fattibene; Paul A. Fattibene

[57] ABSTRACT

A pull bar gripper assembly having a body member with a pusher slidably mounted thereon arranged to engage the end of a workpiece to be pulled. A collar is connected to the pusher. A pair of gripper arms, each having a gripping pad connected on one end thereof, are pivotally mounted on the body member. A toggle link interconnects the other end of each gripper arm to the collar and a coil spring normally biases the pusher toward an inoperative or non-gripping position. In operation, the gripper arms are pivoted into gripping position onto a workpiece as the gripper assembly is advanced toward the workpiece by the retraction of the pusher upon engaging the end of a workpiece. In doing so, the toggle link compressing the coil spring shifts through dead center to lock the gripping pads onto the workpiece. Release is effected by pulling the gripper assembly away from the workpiece slightly, causing the coil spring to return the pusher and gripper arms to their normal inoperative or non-gripping position.

12 Claims, 2 Drawing Sheets

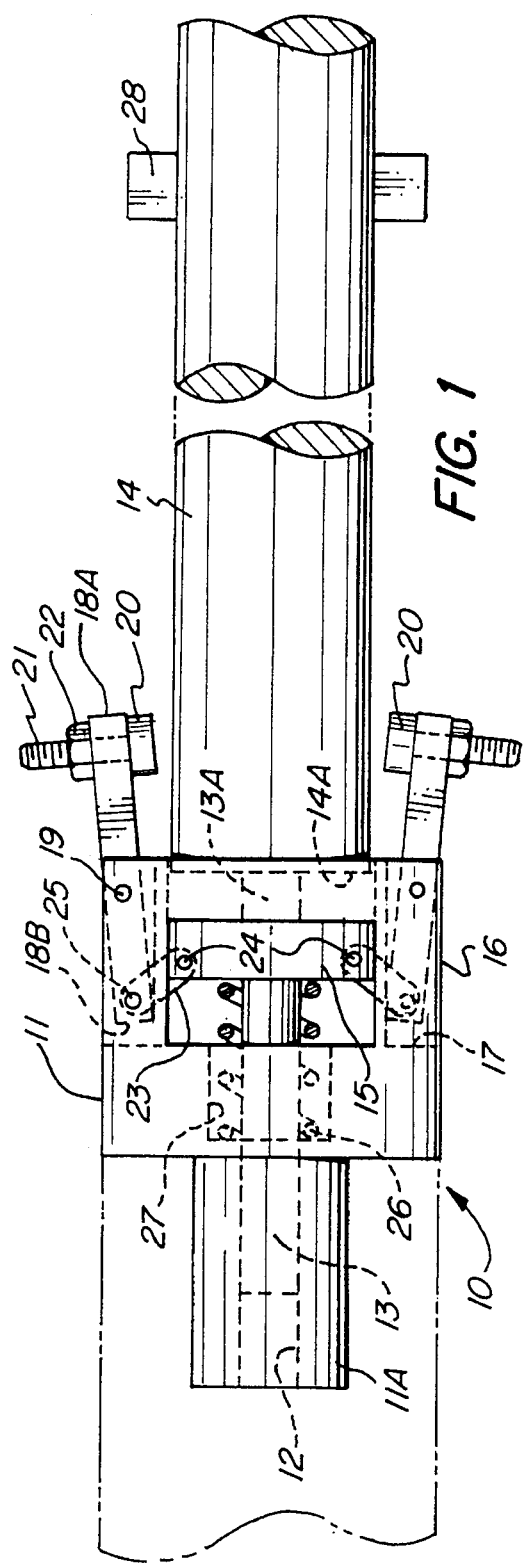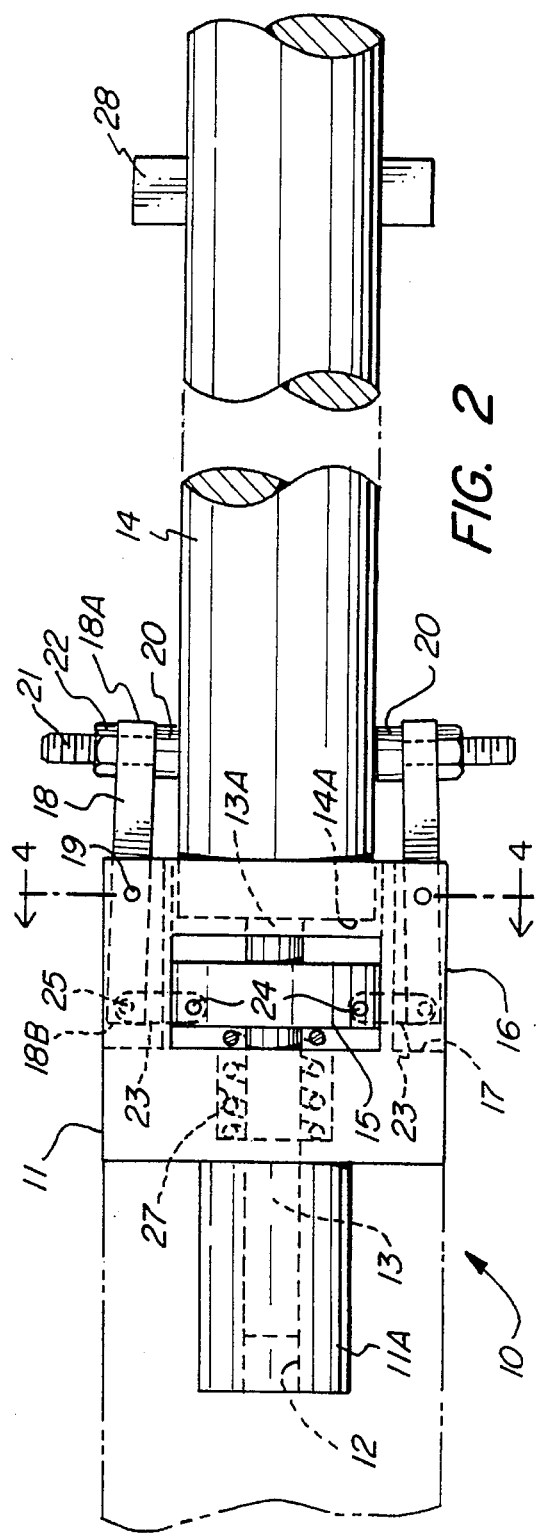

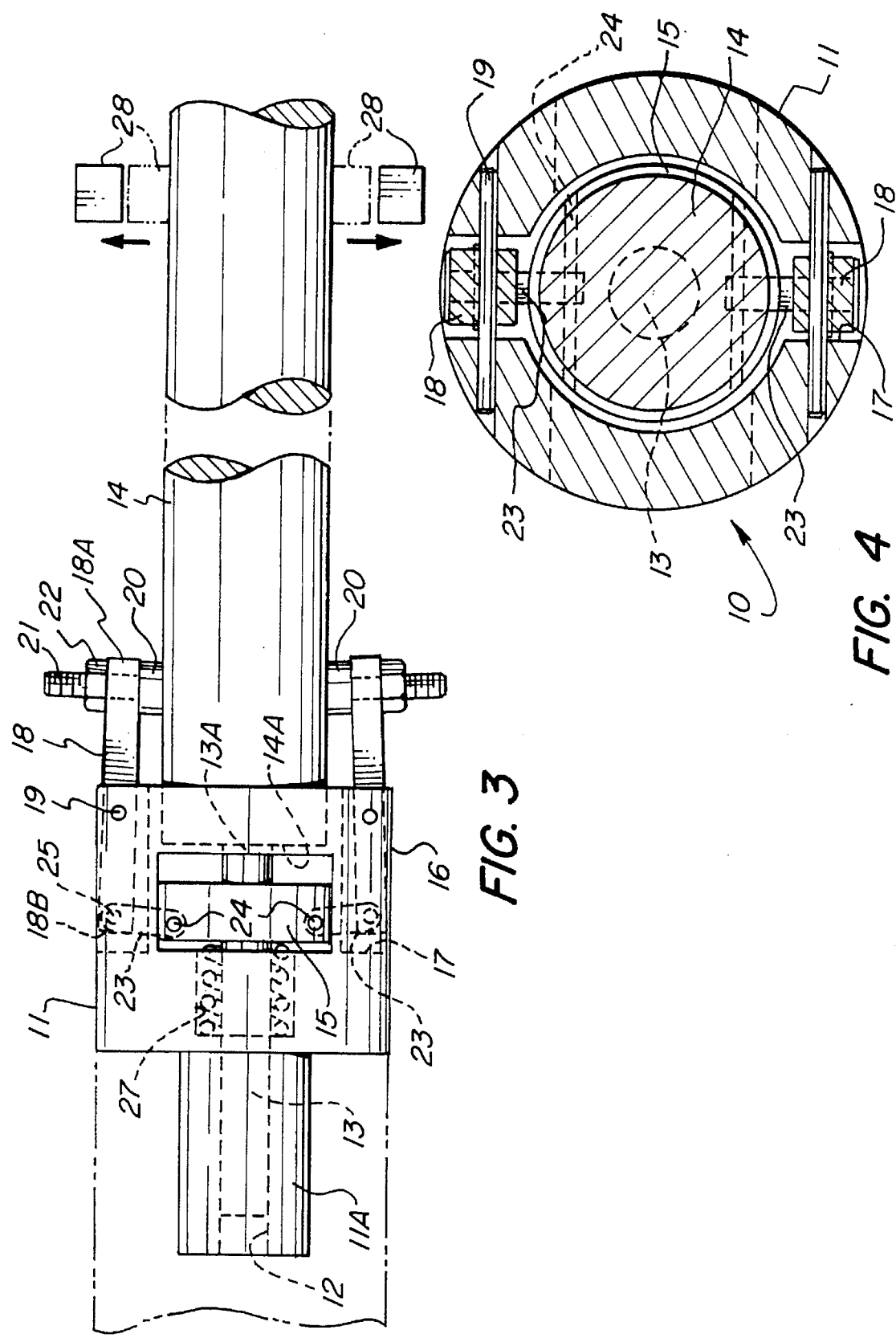

PULL BAR GRIPPER ASSEMBLY

FIELD OF THE INVENTION

This invention relates generally to machine tools, and more specifically to a pull bar gripper for use on a turret lathe or the like.

BACKGROUND OF THE INVENTION

In the field of automatic and/or numerically controlled machine tools, such as an automatic turret lathe and the like, efforts are constantly being made to improve the manner in which a workpiece or stock is fed into an operating position for machining. Such prior efforts for feeding a workpiece into its proper position for machining are disclosed in U.S. Pat. Nos. 2,337,383; 3,582,000; 4,617,847; 4,709,603; 4,580,470; 4,924,738; 5,046,226; and 5,165,313. While such prior known devices may be suitable in particular instances, they appear to be relatively complex and costly in the manufacture and/or assembly thereof.

An object of this invention is to provide a pull bar gripper assembly which is relatively simple in construction, inexpensive in cost, and positive in operation.

SUMMARY OF THE INVENTION

The foregoing object and other features and advantages of this invention are achieved by a simplified bar puller assembly which can be readily attached to a tool holder of an automatic machine tool, e.g. a turret lathe. The bar puller assembly of this invention includes a body member having a shank by which it is secured to a tool holder of a machine tool. Slidably mounted in a bore extending through the body member is a reciprocating pusher which has connected thereto a collar. Circumferentially spaced about the body member are at least a pair of gripper arms that are pivotally connected thereto at a point intermediate of the gripper arms. A gripper pad is adjustably mounted to one end of the respective gripper arms. The other end of the respective gripper arms are connected to the pusher collar by a toggle link, and a spring is interposed between the collar and the main body to exert a spring bias on the collar for normally urging the pusher toward an inoperative or non-gripping position. In operation, as the pull bar assembly is advanced toward a workpiece secured in collet or chuck, the pusher engages the end of the workpiece causing the pusher to be retracted whereby the gripper arms and connected gripper pads close onto and firmly grip the workpiece as the toggle links pass through their dead center point. Upon gripping of the workpiece, the collet automatically releases the workpiece as the lathe turret pulls the gripper assembly and workpiece gripped thereby a predetermined distance to position the workpiece into an operating or machining position. The collet is then again actuated to secure the workpiece in the operating position. With the workpiece secure in a machining position, the lathe turret exerts a pulling force on the pull bar assembly to disengage the pusher from the end of the workpiece, whereby the spring bias acting on the collar of the pusher causes the gripper arms to automatically pivot to a non-gripping position to release the workpiece.

IN THE DRAWINGS

FIG. 1 is a side elevation view of the pull bar gripper assembly illustrating the assembly in a normal inoperative or non-gripping position.

FIG. 2 is a view similar to that of FIG. 1 illustrating the assembly in an intermediate gripping position.

FIG. 3 is a view similar to that of FIGS. 1 and 2, illustrating the assembly in a final gripping position.

FIG. 4 is a sectional view taken along line 4—4 on FIG. 2.

DETAILED DESCRIPTION

Referring to the drawings, there is shown therein a preferred embodiment of the present invention. The pull bar assembly 10 of FIGS. 1 to 3 comprises a body member 11 having a mounting shank 11A by which the pull bar assembly 10 is mounted to a tool holder of a machine tool, e.g. an automatic turret lathe. Extending through the body member 11 and associated mounting shank 11A is a bore 12 for receiving a slidably disposed pusher 13. As best seen in FIG. 1, the end 13A of the pusher 13 is arranged to engage the end 14A of a workpiece 14 to be machined, as will be hereinafter described.

Secured to the pushed 13 at a point intermediate the opposed ends thereof is a radially extending flange or collar 15. In the illustrated embodiment, the body member 10 includes an axially connected extension 11B which may be in the form of an annular sleeve provided with a pair or a plurality of slots 17 circumferentially spaced therearound, and which slots 17 open to one end of the extension or sleeve 11B. In the illustrated embodiment, two such slots 17 are illustrated. However, it will be understood that two or more slots may be provided, depending upon the number of gripping arms desired, as will be hereinafter described.

Connected in each of slots 17 is a gripper arm 18 arranged to pivot about a pivot pin 19. Adjustably mounted on one end 18A of the respective gripper arms 18 is a gripper pad 20. The gripper pad 20 includes a pad formed of a non-slip material, e.g. rubber, which is connected to a threaded bolt 21 mating with a topped opening formed on the end of the gripper arm 18, by which the pad 20 can be adjustably secured to the gripper arm. A lock nut 22 secures the pad in the adjusted position.

The other end 18B of the respective gripper arms is connected to the collar 15 by an interconnecting toggle link 23, the ends of which are pivoted to the gripper arm 18 and collar 15 about pivots 24 and 25. Completing the pull bar assembly is a coil spring 26 which is disposed about the pusher. As shown, the coil spring 26 is disposed between the body member 11 and the collar to exert a spring bias on the collar 15 and connected pusher 13. In the illustrated embodiment, the body member is provided with a recess 27 to provide a seat for the spring 26.

In operation, the pull bar assembly 10 is mounted to tool holder of a turret lathe (not shown) in a conventional manner. With the workpiece 14 normally secured by a collet or chuck 28, which constitutes a conventional component part of the tool machine or turret lathe, the pull bar assembly 10 is brought into axial alignment with the workpiece 14 and advanced toward the workpiece 14. In the advancing position, the gripper arms 18 and associated gripping pads are in their normal inoperative or non-gripping position, as seen in FIG. 1. As the end 13A of the pusher 13 engages the end 14A of the workpiece 14, which is secured by collet 28, the pusher 13 and associated collar 15 are retracted to compress the spring 26, causing the gripping pads 20 to close onto the end of the workpiece 14 to the position as shown in FIG. 2. When the toggle links 23 shift through their dead position, as seen in FIG. 3, the gripping pads are securely fixed and locked onto the workpiece 14, and the spring 26 is in its compressed position.

With the gripping pad 20 securely fixed and locked onto the workpiece 14, as seen in FIG. 3, the machine tool is programmed to effect release of the collet 28 and to shift the pull bar assembly 10 to the left as seen in FIG. 3, to effect the pulling of the workpiece a predetermined amount so as to position it in a machining position. When the workpiece has been properly positioned at its machining position, the collet 28 is automatically actuated to again secure the workpiece while in the machining position.

Release of the pull bar assembly 10 from the workpiece 14 is effected automatically by the shifting of the pull bar assembly in a pulling direction or to the left, as seen in FIG. 3, as the collet 28 secures the workpiece in position. The slight pulling force exerted by the assembly in the direction shown in FIG. 3 causes the pusher 13 to separate from the end 14A of the secured workpiece 14 so that the bias of the spring 26 acting on collar 15 cause the gripper arms 18 to automatically pivot toward their normal, inoperative, non-gripping position. The slight relative sliding that may occur between the gripping pads 20 and the workpiece 14 during initial release is negligible, as the bias of the spring is sufficiently great to effect immediate operation of the gripping arm as the slightest separation between the pusher and the workpiece occurs.

From the foregoing description, it will be apparent that the pull bar gripper assembly 10 is relatively simple in construction, inexpensive to fabricate, and whereby the gripping and non-gripping of the gripper assembly 10 is automatically achieved by the movement of the turret head, to which the assembly 10 is mounted, relative to the workpiece, and without any design modifications to a standard automatic tool machine being required.

While the present invention has been described with respect to the illustrated embodiment, it will be apparent that various modifications maybe made without departing from the spirit and scope of this invention.

What is claimed is:

1. A pull bar gripper assembly for use on a tool machine operative between a gripping and non-gripping position comprising:

a body member, a pusher adapted to engage a workpiece, slidably mounted within said body member for relative movement with respect thereto, a spring means for biasing said pusher relative to said body member, gripping means pivotally mounted on said body member for movement between a gripping and non-gripping position, and link means interconnecting said gripping means to said pusher whereby said gripping means are actuated into gripping position to lock onto a workpiece to be indexed as the pusher is advanced toward and engages a secured workpiece, and whereby said gripping means are actuated to a non-gripping position when said body member is pulled away from and relative to a secured workpiece.

2. A pull bar gripper assembly as defined in claim 1 wherein said gripping means includes:

a pair of gripper arms pivotally connected to said body member, and a gripper pad adjustably mounted on one end of each of said gripper arms.

3. A pull bar gripper assembly as defined in claim 2 wherein said interconnecting means includes:

a collar connected to said pusher, and a toggle link interconnecting each of said gripper arms to said collar.

4. A pull bar gripper assembly as defined in claim 3 and wherein:

said spring means disposed between said collar and said body member for normally biasing said pusher and connected gripping arm toward the non-gripping position.

5. A pull bar gripper assembly as defined in claim 4 wherein said spring means includes a coil spring disposed about said pusher, said coil spring biasing on said collar and body member.

6. A pull bar gripper assembly for use on a tool machine for incrementally advancing a workpiece comprising:

a body member, a pusher slidably mounted on said body member, said pusher having an end portion adapted to engage the end of a workpiece, a collar connected to said pusher, a pair of gripper arms, each of said gripper arms having opposed ends, means for pivotally Connecting each of said gripper arms to said body member at a point intermediate said opposed ends of said gripper arms, a toggle link interconnecting one end of each of said gripper arms to said collar, a gripper pad mounted on the other end of each of said gripper arms, and a spring disposed between said collar and said body member so that as said pusher engages the end of a workpiece, said pusher and connected collar retracts relative to said body member, compressing said spring and pivoting said toggle links causing said gripper arm to pivot to close and lock said gripper pads onto said workpiece, permitting the workpiece to be pulled as the gripper assembly is actuated to index the workpiece a predetermined distance, and said gripper arms being automatically pivoted to a non-gripping position by movement of said body member away from and relative too said workpiece.

7. A pull bar gripper assembly as defined in claim 6 and including means for adjusting each of said gripper pads for adjusting the gripping force of said gripping pads on the workpiece.

8. A pull bar gripper assembly for use on a machine for incrementally advancing a workpiece comprising:

a body member including a mounting shank, said body member and mounting shank having a bore extending therethrough, a pusher adapted to engage workpiece slidably mounted within said bore for movement between a retracted and protracted position, an extension projecting from said body member, said extension having at least a pair of spaced apart slots formed therein, a collar secured to Said pusher intermediate the ends thereof, a coil spring disposed between said collar and said body member, at least a pair of gripping arms, each of said gripping arms having opposed ends, means for pivotally connecting each of said gripping arms intermediate the opposed ends thereof in one of slots, each of said gripper arms having one end extending beyond said extension, a gripper pad connected to said extended one end of each of said gripper arms, a toggle link interconnecting the other end of each of said gripper arms to said collar, whereby said gripper pads are actuated into gripping position onto a workpiece as said pusher engages the end of a workpiece and into a non-gripping position as said pusher is pulled away from and relative to the end of a secured workpiece.

9. A pull bar gripper as defined in claim 8 and including means of adjusting said gripper pads for accommodating workpieces of varying sizes.

10. A pull bar gripper as defined in claim 9 wherein said body member is recessed to define a seat for said spring.

11. A pull bar gripper assembly for use on a tool machine operative between a gripping and non-gripping position for indexing a workpiece and comprising:

a body member having an axial bore therein, a pusher slidably disposed within said bore, said pusher having an end portion arranged to engage a secured workpiece, a collar secured to Said pusher, said collar being spaced from said end portion, at least a pair of gripper arms, said gripper arms having opposed ends, means pivoting each of said gripper arms at a point intermediate said opposed ends thereof to said body member, a link pivotally interconnecting one end of each of said gripper arms to said collar, a gripper connected to the other end of said gripper arms, a biasing means interposed between said collar and said body member normally biasing said pusher for maintaining said gripper arms in a non-gripping position, and said gripper arms being pivoted into gripping position when said pusher engages a secured workpiece, and whereby said gripper arms are pivoted to a non-gripping position when said body member is pulled away from and relative to the secured workpiece.

12. For use on a tool machine having a tool holder and a chuck for holding a workpiece, a pull bar gripper assembly comprising:

a body member adapted to be secured to a tool holder, said body member having an axial bore therein, a pusher slidably mounted in said bore, said pusher being adapted to engage a workpiece secured in a chuck, a collar connected to said pusher, a pair of gripper arms pivotally connected to said body member for movement between a gripping and non-gripping position, each of said gripper arms having one end thereof extending beyond said body member four gripping a workpiece, a link pivotally interconnected to the other end of each of said gripping arms to said collar, a spring means interposed between said body member and said collar for normally biasing said pusher to maintain said gripper arms in a non-gripping position, and said gripping arms being moved into gripping position onto a workpiece secured in said chuck as said pusher engages the workpiece and compresses said spring means when said body member is moved toward the workpiece, and said gripper arms being moved into non-gripping position by the decompressing of said spring means as said body member moves away from and relative to the workpiece secured in the chuck.

\* \* \* \* \*